United States Patent [19]

Wahl, III et al.

[11] 4,276,748

[45] Jul. 7, 1981

[54] RECOVERY OF ENERGY FROM GEOTHERMAL BRINE AND OTHER HOT WATER SOURCES

[75] Inventors: Edward F. Wahl, III, Claremont; Frederic B. Boucher, San Juan Capistrano, both of Calif.

[73] Assignee: Occidental Petroleum Corporation, Los Angeles, Calif.

[21] Appl. No.: 83,112

[22] Filed: Oct. 5, 1979

Related U.S. Application Data

[63] Continuation of Ser. No. 795,523, May 10, 1977, abandoned.

[51] Int. Cl.$^3$ .................................... F03G 7/00
[52] U.S. Cl. ............................ 60/641 D; 60/673; 165/45; 165/111
[58] Field of Search ............... 60/641, 649, 651, 671, 60/673; 122/31 R; 165/45, 111

[56] References Cited

U.S. PATENT DOCUMENTS

| | | | |
|---|---|---|---|
| 3,988,895 | 11/1976 | Sheinbaum | 60/641 |
| 3,998,208 | 12/1976 | Abboud | 122/31 R |
| 4,060,988 | 12/1977 | Arnold | 60/641 |
| 4,089,175 | 5/1978 | Woinsky | 165/45 X |
| 4,149,385 | 4/1979 | Sheinbaum | 60/641 X |

FOREIGN PATENT DOCUMENTS

| | | | |
|---|---|---|---|
| 967093 | 5/1975 | Canada | 165/111 |
| 2162931 | 6/1973 | Fed. Rep. of Germany | 165/111 |
| 563452 | 5/1957 | Italy | 165/111 |

Primary Examiner—Allen M. Ostrager
Assistant Examiner—Stephen F. Husar
Attorney, Agent, or Firm—Max Geldin; Barry A. Bisson

[57] ABSTRACT

Process and system for recovery of energy from geothermal brines and other hot water sources, by direct contact heat exchange between the brine or hot water, and an immiscible working fluid, e.g. a hydrocarbon such as isobutane, in a heat exchange column, the brine or hot water therein flowing countercurrent to the flow of the working fluid. The column can be operated at subcritical, critical or above the critical pressure of the working fluid. Preferably, the column is provided with a plurality of sieve plates, and the heat exchange process and column, e.g. with respect to the design of such plates, number of plates employed, spacing between plates, area thereof, column diameter, and the like, are designed to achieve maximum throughput of brine or hot water and reduction in temperature differential at the respective stages or plates between the brine or hot water and the working fluid, and so minimize lost work and maximize efficiency, and minimize scale deposition from hot water containing fluid including salts, such as brine. Maximum throughput approximates minimum cost of electricity which can be produced by conversion of the recovered thermal energy to electrical energy.

25 Claims, 3 Drawing Figures

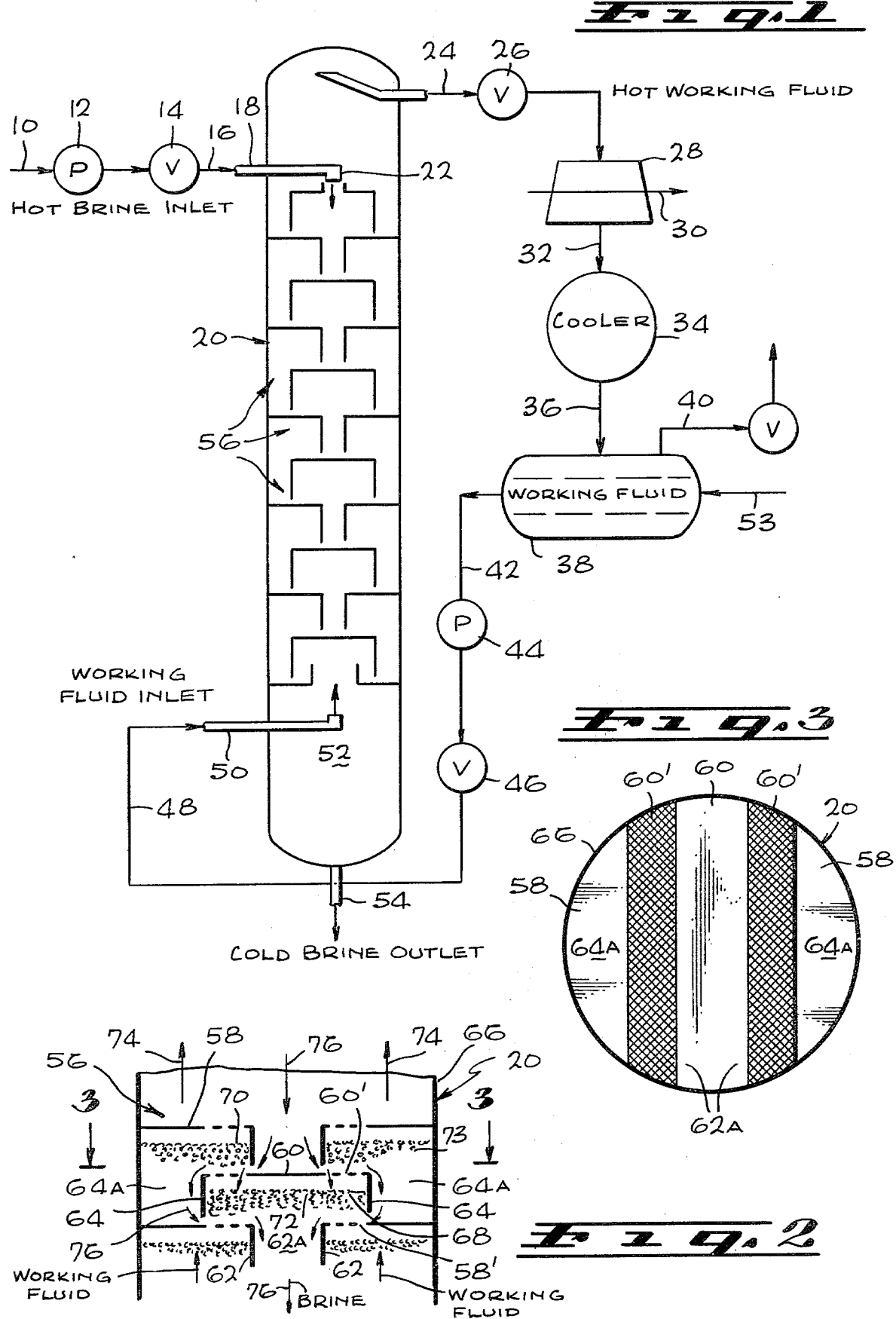

RECOVERY OF ENERGY FROM GEOTHERMAL BRINE AND OTHER HOT WATER SOURCES

The invention described herein was made in the course of, or under a contract with the U.S. Energy Research and Development Administration contract number AT(04-3)-1076.

This is a continuation, of application Ser. No. 795,523, filed May 10, 1977, now abandoned.

BACKGROUND OF THE INVENTION

This invention relates to the recovery of energy from geothermal brines and other hot water sources, and is particularly concerned with a process and system of the aforementioned type, employing direct contact heat exchange between the hot brine or hot water feed, and a working fluid, the process being operated and the system designed to achieve maximum throughput (mass flow rate) of hot brine or hot water feed, maximum efficiency and minimum scale deposition, with minimum diameter of the heat exchange column, and consequently approximate minimum cost.

Direct contact heat exchange (DCHE) has been proposed as a method for recovering thermal energy from scale depositing geothermal fluids, e.g. hot geothermal brine. Thus, U.S. Pat. No. 3,988,895 to Sheinbaum discloses power generation from hot brines by passing a hot fluid containing salt such as geothermal brine, in direct contact heat exchange relation with a working fluid such as isobutane.

In the copending application Ser. No. 589,068, filed June 23, 1975, by Samuel G. Woinsky, there is described a process and system for recovery of energy from geothermal brine and other hot water sources, which comprises cooling the brine or hot water source in direct contact heat exchange relation with a working fluid in a direct contact heat transfer column, and having as an important feature the operation of the heat transfer column at or above the critical pressure of the working fluid.

In the copending application Ser. No. 611,310, filed June 23, 1975, by Samuel G. Woinsky, there is described a similar process and system as in the above mentioned application, and having as an important feature operation of the heat transfer column at a pressure below the critical pressure of the working fluid.

In such direct contact countercurrent heat exchange processes and systems, as described in the above Sheinbaum patent and the above copending applications, in order to transfer heat more effectively for the purpose of utilizing thermal energy from the geothermal brine, the temperature differential between the brine and the working fluid, such as isobutane, should be minimized at each stage throughout the countercurrent heat exchange system. Further, in order to transfer a commercial quantity of heat from geothermal brines to the working fluid, a large volume of the fluids must be handled.

It is accordingly an object of the present invention to provide a process and system for direct contact countercurrent heat exchange between a hot water containing fluid such as geothermal brine, and an immiscible working fluid, so as to obtain maximum throughput, that is, mass flow rate, of such hot aqueous fluid in the column. Another object is to provide a process and system of the above type, and particularly utilizing a sieve plate heat exchange column, wherein the temperature differential between the hot water containing fluid such as brine, and the working fluid are reduced throughout the column, and the column efficiency increased. Still another object is to provide a process and system of the above type wherein lost work is minimized and efficiency maximized. A still further object is the provision of a direct contact heat exchange process and system as described above, wherein scale from hot aqueous liquids containing salts, e.g. geothermal brine, is minimized, while maximizing throughput of hot water containing fluid such as brine in the column.

SUMMARY OF THE INVENTION

Of the various types of direct contact heat exchange columns, including packed columns, sieve plate columns and agitated columns that can be employed in the above described direct contact heat exchange between a hot water containing fluid which can contain salts including geothermal brine, and other hot water containing sources, and an immiscible working fluid, it has been found as one feature of the invention, that a sieve plate column can be designed to achieve the maximum throughput or flow rate of the hot water containing fluid such as brine, with the appropriate working fluid, e.g. isobutane, flow rate. Such sieve plate column is comprised of perforated trays and downcomers associated with such trays, the hot water containing fluid such as geothermal brine, flowing countercurrent to the flow of the working fluid through the perforated trays and the downcomers.

A sieve plate column can be designed to achieve the highest throughput of brine required for geothermal energy utilization, for example, 1,000,000 lb/hr or more of brine. Such perforated plate towers have distinct regions for dispersion and separation of the phases. One phase can be dispersed by jetting through perforations into a continuum of the other phase, and the dispersed phase settles through the other until it coalesces within a continuum of the dispersed phase adjacent to the next plate. The continuous phase fluid flows across the tower and down the downcomers. The throughput of the column is limited by the brine flow rate at which the dispersed phase drops are carried through the downcomer by the brine. A sieve tray column can have a design throughput of 12,000 to 15,000 lb/hr ft$^2$ of brine whereas that of a packed column is only about 6000–9000 lb/hr ft$^2$ brine.

When employing such sieve plate heat exchange column, it has been found that the diameter of the holes in the trays, the number of holes therein, the downcomer area and the spacing between adjacent trays can be selected to obtain maximum throughput of the hot water containing fluid, e.g. geothermal brine, in the column.

Further, it has been found that the column average temperature differential between the hot water containing fluid such as hot brine, and the working fluid in the column can be reduced by increasing the number of sieve plates employed. In this respect it has been found for increased efficiency and economy, that from 5 to 8 equilibrium stages, corresponding to six to nine 85% efficient sieve plates, depending on the particular heat exhange system, produced best results.

Further, theoretical work has shown that under typical operating conditions, column diameter, and hence column cost, is independent of flow rate of the working fluid, e.g. isobutane, and is directly dependent on rate of flow of the hot water containing fluid or brine.

Also, it has been found as an additional feature that the ratio of the flow rate of the hot water containing fluid, e.g. geothermal brine, and the working fluid such as isobutane, can be selected to minimize lost work and to maximize efficiency.

It has also been found that in the direct contact heat exchange process and system, wherein the hot water or brine source flows in direct countercurrent heat exchange relation with the working fluid through the column, one of these two fluids being a continuous phase fluid, that the continuous phase fluid can be selected to minimize scale deposition while at the same time maximizing throughput of the brine in the column, consistent with satisfactory tray efficiency.

The above features and advantages can be achieved, according to the invention, where the heat exchange column is operated at or above the critical pressure of the working fluid, with the hot brine or hot water feed at or above the critical temperature of the working fluid, in accordance with the invention of the above copending application 589,068, or the process and system can be operated so that the heat exchange column is maintained at a pressure below the critical pressure of the working fluid, in accordance with the invention of above copending application Ser. No. 611,310.

Other features and advantages of the invention will be apparent from the description below the preferred embodiments of the invention.

THE DRAWINGS

The above and other features and advantages of the invention will be more clearly understood by reference to the following detailed description of the invention, taken in connection with the accompanying drawing wherein:

FIG. 1 is a schematic outline of a sieve plate heat exchange column employed according to the invention, including a schematic flow diagram of the basic direct contact heat exchange electrical generation system;

FIG. 2 is a sectional detail showing in greater detail the sieve plates comprised of perforated plates and downcomers; and FIG. 3 is an enlarged horizontal sectional detail of the perforated trays and downcomers of FIG. 2, taken on line 3—3 of FIG. 2.

FIG. 2 also illustrates the interaction of the hot brine and the working fluid.

DESCRIPTION OF PREFERRED EMBODIMENTS

Referring to FIG. 1 of the drawing, geothermal brine or hot water which may be degassed to partially remove noncondensible gases, enters through inlet means or conduit 10 and is passed to pump 12 which discharges via valve 14 and conduit 16 into an inlet 18, from which the hot water or brine is discharged into the top of a cylindrical heat exchange column 20 in direct contact heat exchange with a working fluid. Such working fluid can be any suitable material which is immiscible with water, and such working fluid can have a density less than or greater than the density of the hot water containing fluid or brine, provided that the same density relation exists along the length of the column. For example, if the density of the working fluid at the cold end of the column was greater than the density of the brine or water at that end of the column, and at the hot end of the column the density of the working fluid was less than the density of the brine or water at that end of the column, countercurrent flow of working fluid and water containing fluid such as brine would be prevented.

Thus, the working fluid can be a hydrocarbon including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane (2,2-dimethylpropane), n-hexane, cyclohexane, n-heptane, n-octane, isooctane, and the analogous olefins such as n-butene, isobutene, and the like. Most desirably, parafinic or olefinic hydrocarbons containing from about 3 to about 6 carbon atoms are employed. Aromatic hydrocarbons such as benzene, toluene, and xylene also can be used.

Mixtures of such hydrocarbons can also be utilized, such as, for example, a mixture of methane and ethane, ethane and propane, or propane and n-butane, to optimize the critical temperature and pressure conditions of the working fluid, and thereby obtain maximum energy recovery from the geothermal brine or hot water feed.

Working fluids other than hydrocarbons are also suitable provided they at least have the proper density relation to the hot aqueous fluid or brine as noted above and are immiscible.

Inlet temperature of the hot water or brine to the top of the column ranges from about 150° to about 600° F., with a range of about 300° to about 500° F., e.g. about 400° F., being customary for hot geothermal brine. Although the heat exchange column 20 can be operated above, or below, or at the critical conditions of the working fluid, in one embodiment the heat transfer column is operated above the critical pressure of the working fluid in the top of the column, such pressure preferably range from about 450 psia to about 1,000 psia, usually from about 500 to about 700 psia. The working fluid is heated in heat exchange column 20 by direct contact with the incoming hot brine or hot water. For this purpose an inlet nozzle 22 can be provided at the top of the column, for directing the hot brine or hot water downwardly into the column. As described in greater detail below, in the system illustrated in FIG. 1, the working fluid passing upwardly in the column from the bottom thereof, countercurrent to the flow of feed brine or water, causes heat to be transferred from the hot brine to the cold working fluid and the hot working fluid in the top of the column is passed through conduit 24, via valve 26, to a work expander 28, where the heated working fluid expands to produce work which is transferred through shaft 30. A "knockout pot" (not shown) can be placed before the work expander and a demister (not shown) can be present in the top section of the column. The bottom of the column should be designed to provide "surge volume". The discharged expander working fluid is then passed via conduit 32 to a cooler 34, and the condensed working fluid is then fed via conduit 36 to an accumulator 38.

Water vapor present in the working fluid in line 24 condenses in cooler 34, and is separated from condensed working fluid in accumulator 38, along with any uncondensibles which may be present. Uncondensed gas is vented at 40 from the accumulator.

The condensed working fluid in accumulator 38 is removed through line 42 and through pump 44 to pressurize the working fluid approximatley to the pressure in the heat exchange column 20 and the pressurized fluid is then fed via valve 46 and conduit 48 to the inlet 50, through which the cold working fluid is introduced into the bottom portion 52 of the heat exchange column 20, to be reheated therein. Make-up working fluid can be introduced into the accumulator at 53. Cooled brine or water in the bottom of the heat exchange column is discharged at 54. Any scale formed in the heat exchange column 20 can also be discharged at 54.

It will be understood that the above described method of work expanding, condensing, separating and recycling working fluid to the column 20 forms no part of the present invention, and if desired, fresh working fluid from any source can be introduced at 50 into the column.

In accordance with preferred practice, and as illustrated in FIG. 1, the heat exchange column 20 is a sieve plate column. Also, in one embodiment the partial pressure of the working fluid in the working fluid stream at the top zone of the column can be at or above the critical pressure of the working fluid.

It will be noted, as seen in FIGS. 1 to 3 of the drawing, that the sieve plates, indicated at 56, are vertically spaced along the heat exchange column between the upper and lower end portions thereof. The sieve plates shown are of two types, 58 and 60, plates 58 having a diameter equal to the diameter of the column, and extending to the side wall of the column, and the perforated trays 60 being disposed centrally of the trays 58 and spaced therefrom, trays 60 having a width smaller than the diameter of the trays 58. It will be noted that the perforations 58' in the trays 58 are essentially in alignment with the perforations 60' in trays 60.

It will also be noted that trays 58 and 60 of the respective sets of sieve plates 56, are alternately disposed, plates 58 each being provided with a center downcomer or downspout 62 and the plates 60 being provided with two opposite side downcomers 64. Thus, the center downcomers 60 of the plates 58 provide a center downcomer cross sectional area 62A, and the side downcomers 64 of the perforated trays 60 provide a side downcomer area 64A between the side downcomers 64 and the wall 66 of the heat exchange column 20.

The sieve plate construction 56 described above this provides a number of stages or plates 56 wherein each stage includes mixing sections 68 and 70 above perforations 58' and 60', and settling sections 72 and 73 above the downcomer areas 62A and 64A, respectively. In the mixing sections 68 and 70, the two liquids, that is the hot geothermal brine and the working fluid, are intimately and thoroughly mixed so as to transfer the maximum amount of heat from the hot geothermal brine or hot water to the working fluid. This is theoretically accomplished in an equilibrium stage if the temperatures of the two fluids are essentially identical before they leave the stage. The settling sections 72 and 73 utilize the density difference between the brine or hot water, and the working fluid, and gravity to accomplish a separation of the two fluids.

In these settling sections, the lighter working fluid, e.g. isobutane, phase coalesces and flows upward as indicated by arrows 74 whereas the brine or water phase flows downwardly through the central and side downcomer areas 62A and 64A, respectively, as shown by arrows 76. In the optimum device, it will be noted that the mixing sections 68 and 70 will contain small droplets to achieve equilibrium heat transfer between the two phases.

A computer model based on stage-wise energy and material balances of the direct contact heat exchange (DCHE), throughput estimation, stage efficiency, conventional cost prediction methods and work generation equations was used to predict the power output and cost of electricity for the DCHE system. These computer computations gave the same output work W predictions as obtained from the following equation:

$$W = e_t[\Delta h - T_{EX}\Delta_s - \int(c_p \Delta T/T_z)dT_z] - W_1(1/e_l - e_l) - W_2 + W_3$$

The efficiency of the DCHE can be readily evaluated and optimized by evaluating or minimizing the work lost in the DCHE, which is the third term $\int(C_p\Delta T/T_Z)dT_Z$ in the above equation. For example, the efficiency $e_D$ of the DCHE is given by 1-[lost work in the DCHE)/(work output)] thusly:

$$e_D = 1 - [\{\int(c_p\Delta T/T_z)dT_z\}/W]$$

where:
$c_p$—heat capacity of brine
$e_l$—efficiency of brine pump
$e_D$—efficiency of DCHE
$e_t$—efficiency of isobutane turbine expander
$\Delta h$—enthalpy difference between brine inlet and exhaust
$\Delta s$—entropy difference between brine inlet and exhaust
$T_{EX}$—temperature of condensing isobutane
$T_z$—temperature of brine in DCHE
$\Delta T$—difference between isobutane and brine temperature in DCHE
W—net work output from system
$W_1$—theoretical work of brine pump
$W_2$—work of isobutane pump
$W_3$—work of brine pressure recovery turbine Since $\Delta T$ is a function of the ratio of working fluid, e.g. isobutane, to brine flow rate, the lost work will be minimized and the efficiency maximized by operating at the proper ratio of flow rate of hot geothermal brine or hot water, and working fluid. Also, the $\Delta T$ in the column can be reduced by increasing the number of sieve plates in the above sieve plate column, thereby reducing the lost work and thus increasing the thermal efficiency.

The number of plates is determined by balancing the cost of the column, which increases with increasing number of plates, against the increased work output so as to minimize the cost of electricity. The increase dW in work output for a given ratio of working fluid to brine or water is a result of the decrease in $\Delta T$ throughout the column due to the increase in the number N of plates and can be obtained from the work loss term by the equation $$dW = -d/dN[\int(c_p\Delta T/T_z)dT_z]dN$$

The calculations of the thermal efficiency and power output show that for more than 8 theoretical stages or plates, the increase in efficiency and net output became quite small. Greatest efficiency and minimum cost occur in the 5 to 8 equilibrium stage range. This corresponds to the use of six to nine 85% efficient plates. For practical ratios of working fluid to brine, column diameter and therefore column cost is independent of working fluid, e.g. isobutane, flow rate, and depends directly on the brine flow rate. Consequently, a decrease in cost occurs when the working fluid or isobutane mass flow rate is changed relative to the geothermal brine mass flow rate so as to approach the minimum of the integral in the above equations. Further, by employing mixtures of working fluids which have appropriate enthalpy versus temperature properties, such integral can be reduced further below that which otherwise would be obtained, thereby improving the thermodynamic efficiency and increasing the net work output.

Assuming that a particular working fluid, such as isobutane, and the use of a particular column type, such as the sieve plate column noted above, are selected, the design procedure consists in selecting the continuous phase, designing the sieve plate configuration, and determining the number of plates.

The continuous phase liquid is selected so as to minimize scale deposition and maximize throughput of geothermal brine consistent with satisfactory tray efficiency. The interfacial area per unit volume of fluid is greater when the liquid with the larger volumetric flow is dispersed into the other, and the temperature of each will more rapidly approach equilibrium.

Using the fluid with the smaller volumetric flow rate as the continuous phase gives maximum throughput for a given downcomer velocity corresponding to a given tendency to entrain drops of the dispersed phase. Therefore, for a given downcomer area and a limiting terminal velocity for dispersed phase drop settling, using the fluid with the smaller volumetric flow rate for the continuous phase results in the largest column throughput. Thus, tray efficiency and also throughput are usually greater if the higher volumetric flow rate fluid, that is the working fluid such as isobutane, is dispersed in the brine, and thus forms the discontinuous phase, and the hot geothermal brine or hot water, is the continuous phase fluid.

The diameter of the holes 58' and 60' in the perforated trays 58 and 60, the number of such holes, the downcomer cross-sectional area, that is the total of the center and side downcomer cross-sectional areas 62A and 64A, and the spacing between the perforated trays, e.g. 58 and 60, are selected so as to maximize throughput of the hot geothermal brine or hot water, assuming appropriate working fluid flow rate through the column. Ideally, this should be done for each perforated tray and in a cylindrical column, as illustrated in the drawing, one tray will have a limiting hot water containing fluid or brine throughput, which will be the maximum design throughput for the column. With experience, the limiting tray can be determined from the physical properties, that is, density, viscosity and surface tension, of the working fluid and the hot water containing fluid or brine, and in the case of the use of isobutane at supercritical pressures in the column, such limiting tray is the bottom tray.

Maximum throughput of hot geothermal brine or hot water, for a given diameter column corresponds to maximum downcomer area, that is the center downcomer and side downcomer cross sectional areas 62A and 64A, since this gives the maximum brine or hot water rate for a given terminal velocity of the working fluid drops. The terminal velocity is a function of the drop diameter which is in turn a function of the hole diameter and pressure drop. The required bubbling area is a function of the total hole area and the working fluid, e.g. isobutane flow rate as determined by the above thermodynamic considerations for a given brine rate. The bubbling area, i.e. active tray area containing the holes, plus inactive areas, plus total downcomer area equals the total tray area. These factors determine the relationship of column diameter and hot brine or water flow rate, or throughput. These relationships are solved simultaneously for the hole diameter, bubbling area, downcomer area, and design flow rates. Tray spacing depends on flow across the tray and the working fluid, e.g. isobutane, pressure head which in turn is related to the hole diameter and working fluid, e.g. isobutane, flow rate.

The velocity $u_w$ of the brine in the downcomer must be equal to or less than the terminal velocity of the isobutane drops, $u_t$, which in turn is a function of the isobutane drop diameter, to prevent working fluid or isobutane entrainment and flooding. For maximum brine throughput $u_w = u_t$ and the required downcomer area $A_D$ is given by the equation $$A_D = Q_w / u_t$$

where $Q_w$ is the volumetric flow rate of water brine.

Column capacity is also affected by the tray spacing. The working fluid, e.g. isobutane, phase coalesces and collects below each plate. The pressure must be higher below the plate than above to force the isobutane through the holes. This pressure difference is the depth of the coalesced isobutane layer times the density difference of the phases. Also the linear velocity of brine flowing across the tray should be less than the downcomer velocity. Minimum tray spacing is the sum of the depth of the coalesced isobutane layer plus the height required by the linear velocity of the brine.

For thermodynamically practical ratios of working fluid to brine, the calculated depth of working fluid below the tray does not vary significantly, thus for this range of relative working fluid flow rates, the reworking fluid rates are said to be not a factor in capacity determinations.

For high interfacial tension as in the brine-isobutane system, small holes are usually necessary to provide good dispersion. Hole diameters of ⅛ to ¼ inch are satisfactory, with the total open area equal to between about 15 and 25% of the bubbling area. The working fluid, e.g. isobutane, velocity through the holes should be such that the working fluid streams through such holes and breaks up a slight distance above the plate. Usually such velocity is more than 0.5 ft./sec.

In an example for determining tray layout for a 12-foot diameter sieve tray DCHE column, as illustrating in FIGS. 1 to 3 of the drawing, using isobutane as working fluid and supercritical working fluid pressure in the column, the brine feed is at 325° F., isobutane feed is at 130° F., with isobutane outlet temperature at 295° F. and brine outlet temperature at 175° F., and with equal iso0 butane-brine mass flow rates.

Under these conditions, using suitable equations, it is calculated that the downcomer area per tray is 34.1 ft.$^2$, and for such design, the perforated trays have ¼ inch holes, with a total hole area equal to 22% of the bubbling area. Actual tray spacing is 24 inches with downcomers extending 4 inches below the plate.

Conceptual design and feasibility analysis showed that of various column types, a sieve plate column using a brine throughput of 12,000 lb/hr ft$^2$ gives the minimum cost of electricity.

Tests of direct contact heat exchangers operated at 500 to 650 psia using isobutane working fluid and geothermal brine showed that the invention system operates successfully without scale deposition. In such tests two 8 inch internal diameter DCHE columns were operated intermittently for performance data and continuously for scale deposition data using U.S. Bureau of Reclamation's East Mesa Well 6-2. A 10 foot high column containing 40 inches of Goodloe stainless steel packing was operated 70 continuous hours and intermittently. At the conclusion of this run the column was inspected and was found free of scale deposits. The other, an 18 foot high column containing 12 carbon steel sieve plates with 1 foot spacing, was operated continuously for seven days. No scale deposition was present and the column was actually cleaner after the run than before. Both the continuous and intermittent operation of either column and the test apparatus was trouble-free without scale deposition. Steady operation was maintained by the automatic control system for both subcritical and supercritical operation, with respect to pressure of the working fluid, isobutane.

In the sieve plate column in these tests, the diameter of the holes in the perforated trays forming the sieve plates was ⅛ inch, the number of holes in each tray was 282, the downcomer area was 0.058 ft$^2$ and the bubbling area was 0.12 ft$^2$, and the spacing between perforated trays was 12 inches.

The diameter of the holes, the number of such holes, the downcomer area and the spacing between the perforated trays were selected, as described above, so as to maximize throughput of the hot geothermal brine in the column.

Some typical performance data for the experimental runs is given in Tables 1 and 2. The data in Table 1 is for the above noted packed column and the data in Table 2 is for the above noted carbon steel sieve plate column. Typically the geothermal brine entered the top of the column at 330° F. and heated isobutane entering the bottom of the column at 80° F. was heated to 290° F. at the top of the column. Column pressure was varied from 500 to 650 psia. The packed column was operated at rates up to 2000 lb/hr (5730 lb/hr ft$^2$) and the sieve plate column at rates up to 4200 lb/hr (12,000 lb/hr ft$^2$). The efficiency of the sieve plate column was 90 to 100%. Flooding, the column brine flow rate limit, occurred at 4700 lb/hr (13,500 lb/hr ft$^2$) for the sieve plate column.

The isobutane in the brine outlet stream from the DCHE corresponds to the solubility of isobutane at that temperature and pressure. Consequently isobutane was not entrained in the brine outlet. The amount of water in the overhead stream corresponds to the partial pressure of water at that temperature. Consequently no brine was entrained in the hot isobutane stream from the top of the DCHE.

The working fluid can be any substance which is non-reactive and immiscible with the hot aqueous fluid and which has a density difference which enables counter current flow with the hot aqueous fluid (e.g., fluoro carbons, and higher alkyl, aryl or alkyl aryl ethers.

TABLE 1

| Summary of Performance Data for Packed Column | | | | | | |
|---|---|---|---|---|---|---|
| Mass Flow Rates (lbs/hr) | | Column Pressure | Temperatures (°F.) | | | |
| | | | Brine | | Isobutane | |
| Brine | Isobutane | psia | Inlet | Outlet | Inlet | Outlet |
| 1840 | 970 | 600 | 335 | 230 | 87 | 301 |
| 2345 | 1540 | 548 | 338 | 186 | 80 | 292 |
| 2585 | 1520 | 557 | 339 | 208 | 82 | 293 |
| 1865 | 1075 | 565 | 333 | 207 | 96 | 291 |

TABLE 2

| Summary of Performance Data for Sieve Plate Column | | | | | | |
|---|---|---|---|---|---|---|
| Mass Flow Rates (lbs/hr) | | Column Pressure | Temperatures (°F.) | | | |
| | | | Brine | | Isobutane | |
| Brine | Isobutane | psia | Inlet | Outlet | Inlet | Outlet |
| 2290 | 1860 | 640 | 337 | 173 | 103 | 286 |
| 2345 | 1930 | 640 | 336 | 170 | 100 | 286 |
| 2345 | 1990 | 640 | 340 | 170 | 102 | 286 |
| 2345 | 2035 | 640 | 339 | 169 | 103 | 287 |
| 3210 | 2550 | 650 | 320 | 162 | 93 | 282 |
| 3210 | 2520 | 650 | 323 | 185 | 115 | 287 |
| 3210 | 3070 | 650 | 329 | 162 | 99 | 284 |
| 3695 | 3800 | 550 | 334 | 139 | 86 | 268 |
| 4085 | 3105 | 550 | 337 | 156 | 86 | 281 |
| 4095 | 3190 | 500 | 340 | 145 | 95 | 273 |
| 4110 | 2440 | 500 | 340 | 185 | 97 | 303 |
| 3970 | 3000 | 650 | 337 | 174 | 96 | 294 |

Employment of a sieve plate column for direct contact heat exchange between geothermal brine and the isobutane working fluid, in accordance with the invention principles, provides substantially greater throughput of brine and isobutane as compared to use of a packed column or other types of columns such as a spray type column under substantially the same operating conditions.

From the foregoing, it is seen that the present invention provides an improved process and system for direct contact heat exchange between a hot water containing source such as hot geothermal brine, and a working fluid, for recovery of energy from such hot water containing source, which permits obtaining high fluid throughput or mass flow rates of the hot water containing fluid, in the heat exchange column, while obtaining high operating efficiency, and reducing heat eschange column costs and lost work, and preventing scaling problems. The recovered thermal energy can be converted to electrical energy, or such thermal energy can be employed for other uses, such as space heating or process heating, e.g. drying, and the like. Maximum throughput approximates minimum cost of electricity which can be produced by conversion of the recovered thermal energy to electrical energy.

While we have described particular embodiments of the invention for purposes of illustration, it will be understood that various changes and modifications within the spirit of the invention can be made, and the invention accordingly is not to be taken as limited except by the scope of the appended claims.

What is claimed is:

1. In a process for recovery of energy from hot water-containing fluids including geothermal brine and other hot water-containing sources, by introducing said hot water-containing fluid in a heat exchange column in direct heat exchange relation therein with an immiscible working fluid in liquid form, the improvement which comprises
  (a) providing a plurality of vertically spaced sieve plates in said column, said sieve plates including perforated trays and downcomers associated with said trays, and
  (b) flowing said hot water-containing fluid and said working fluid in countercurrent direct heat exchange relation through said perforated trays and said downcomers,
  the diameter of the holes in said trays, the number of holes therein, the downcomer area and the spacing between adjacent trays being selected to obtain maximum throughput, i.e. mass flow rate, of said hot water-containing fluid in said column, and wherein maximum throughput of said water-containing fluid corresponds to maximum downcomer area.

2. The process as defined in claim 1, wherein said working fluid comprises a fluorocarbon refrigerant or hydrocarbon selected from the group consisting of aromatics, paraffins, naphthenes and olefins, and mixtures thereof.

3. The process as defined in claim 1, wherein the hot water-containing fluid comprises geothermal brine and said working fluid comprises isobutane.

4. In a process for recovery of energy from hot water-containing fluids including geothermal brine and other hot water-containing sources, by introducing said hot water-containing fluid in a heat exchange column in direct heat exchange relation therein with an immiscible working fluid in liquid form, the improvement which comprises (a) providing a plurality of vertically spaced sieve plates in said column, said sieve plates including perforated trays and downcomers associated with said trays, and (b) flowing said hot water-containing fluid and said working fluid in countercurrent direct heat exchange relation through said perforated trays and said downcomers, the diameter of the holes in said trays, the number of holes therein, the downcomer area and the spacing between adjacent trays being selected to obtain maximum throughput, i.e. mass flow rate, of said hot water-containing fluid in said column, and wherein the bottom tray has the limiting maximum throughput of hot water-containing fluid.

5. The process as defined in claim 4, wherein said working fluid comprises a fluorocarbon refrigerant or hydrocarbon selected from the group consisting of aromatics, paraffins, nephthenes and olefins, and mixtures thereof.

6. The process as defined in claim 4, wherein the hot water-containing fluid comprises geothermal brine and said working fluid comprises isobutane.

7. In a process for recovery of energy from hot water-containing fluids including geothermal brine and other hot water-containing sources, by introducing said hot water-containing fluid in a heat exchange column in direct heat exchange relation therein with an immiscible working fluid in liquid form, the improvement which comprises (a) providing a plurality of vertically spaced sieve plates in said column, said sieve plates including perforated trays and downcomers associated with said trays, and (b) flowing said hot water-containing fluid and said working fluid in countercurrent direct heat exchange relation through said perforated trays and said downcomers, the diameter of the holes in said trays, the number of holes therein, the downcomer area and the spacing between adjacent trays being selected to obtain maximum throughput, i.e. mass flow rate, of said hot water-containing fluid in said column, and wherein the velocity of the hot water-containing fluid in the downcomers, $u_w$, equals the terminal velocity of the working fluid drops, $u_t$, and the required downcomer area $A_D$ is given by the equation $$A_D = Q_w/u_t$$

where $Q_w$ is the volumetric flow rate of said water-containing fluid.

8. The process as defined in claim 7, the temperature differential between said hot water containing fluid and said working fluid at each stage at the respective sieve plates in said column, being reduced by increasing the number of said sieve plates.

9. The process as defined in claim 7, employing a number of said sieve plates ranging from six to nine approximately 85% efficient said sieve plates.

10. The process as defined in claim 7, wherein column diameter is independent of rate of flow of said working fluid and is directly dependent on rate of flow of said hot water containing fluid.

11. The process as defined in claim 7, including selecting the ratio of the flow rates of said hot water containing fluid and said working fluid, to minimize lost work and to maximize efficiency.

12. The process as defined in claim 7, wherein the spacing between adjacent trays is dependent on rate of fluid flow across the respective trays, and the working fluid pressure head.

13. The process as defined in claim 1, wherein the hot water containing fluid is geothermal brine and said working fluid is isobutane.

14. The process as defined in claim 13, said heat exchange column being maintained at or above the critical pressure of said working fluid.

15. The process as defined in claim 14, including expanding the heated working fluid in an expander to produce work, cooling and condensing said expanded working fluid, separating said condensed working fluid from condensed water and any noncondensible gas and returning said condensed working fluid under pressure to said heat exchange column.

16. The process as defined in claim 7, wherein said working fluid is a fluorocarbon refrigerant or hydrocarbon selected from the group consisting of aromatics, paraffins, naphthenes and olefins, and mixtures thereof.

17. The process as defined in claim 7, wherein said working fluid is a paraffinic or olefinic hydrocarbon containing from about 1 to about 8 carbon atoms, or mixtures thereof.

18. The process as defined in claim 7, wherein said working fluid is a paraffinic or olefinic hydrocarbon containing from about 3 to about 6 carbon atoms, or mixtures thereof.

19. The process as defined in claim 7, which includes introducing said hot water-containing fluid into the top of said column and introducing said working fluid into the bottom of said column, one of said hot water-containing fluid and said working fluid comprising a continuous phase fluid and the other comprising a discontinuous phase fluid.

20. The process as defined in claim 19, the continuous phase fluid being selected to minimize scale deposition and to maximize throughput of said hot water-containing fluid in said column.

21. The process as defined in claim 20, employing geothermal brine, said brine comprising the continuous phase fluid and said working fluid being dispersed in said brine and comprising the discontinuous phase.

22. In a system for recovering energy from hot water-containing fluids including geothermal brine and other hot water-containing sources, including a heat exchange column, means for introducing said hot water-containing fluid into said column, means for introducing a working fluid into said column for heat exchange between said hot water-containing fluid and said working fluid, the improvement which comprises employing a heat exchange column containing a plurality of vertically spaced sieve plates including perforated trays and downcomers associated with said trays, permitting countercurrent flow of said hot water-containing fluid and said working fluid through said perforated trays and said downcomers, the diameter of the holes in said trays, the number of holes therein, the downcomer area and the spacing between adjacent trays being selected to obtain maximum throughput, i.e. mass flow rate, of said hot water-containing fluid in said column, and wherein the velocity of the hot water-containing fluid in the downcomers, $u_w$, equals the terminal velocity of the working fluid drops, $u_t$, and the required downcomer area $A_D$ is given by the equation $$A_D = Q_w/u_t$$

where $Q_w$ is the volumetric flow rate of said water-containing fluid.

23. The system as defined in claim 22, employing a number of said sieve plates ranging from six to nine approximately 85% efficient said sieve plates.

24. The system as defined in claim 22 wherein there is a series of pairs of said perforated trays in spaced vertical relation, one of said trays containing a center downcomer and the other of said spaced trays having a pair of side downcomers.

25. The system as defined in claim 24, the perforations in adjacent said perforated trays being in substantial alignment, permitting flow of said working fluid upwardly through said perforations for mixing with said hot water containing fluid and permitting separation and flow of said hot water containing fluid downwardly through said center and side downcomers.

* * * * *